J. H. GENTER.
PROJECTING APPARATUS.
APPLICATION FILED MAY 14, 1913.

1,097,013.

Patented May 19, 1914.
2 SHEETS—SHEET 1.

WITNESSES
H. J. Walker

INVENTOR
Jacob H. Genter
BY Munn & Co
ATTORNEYS

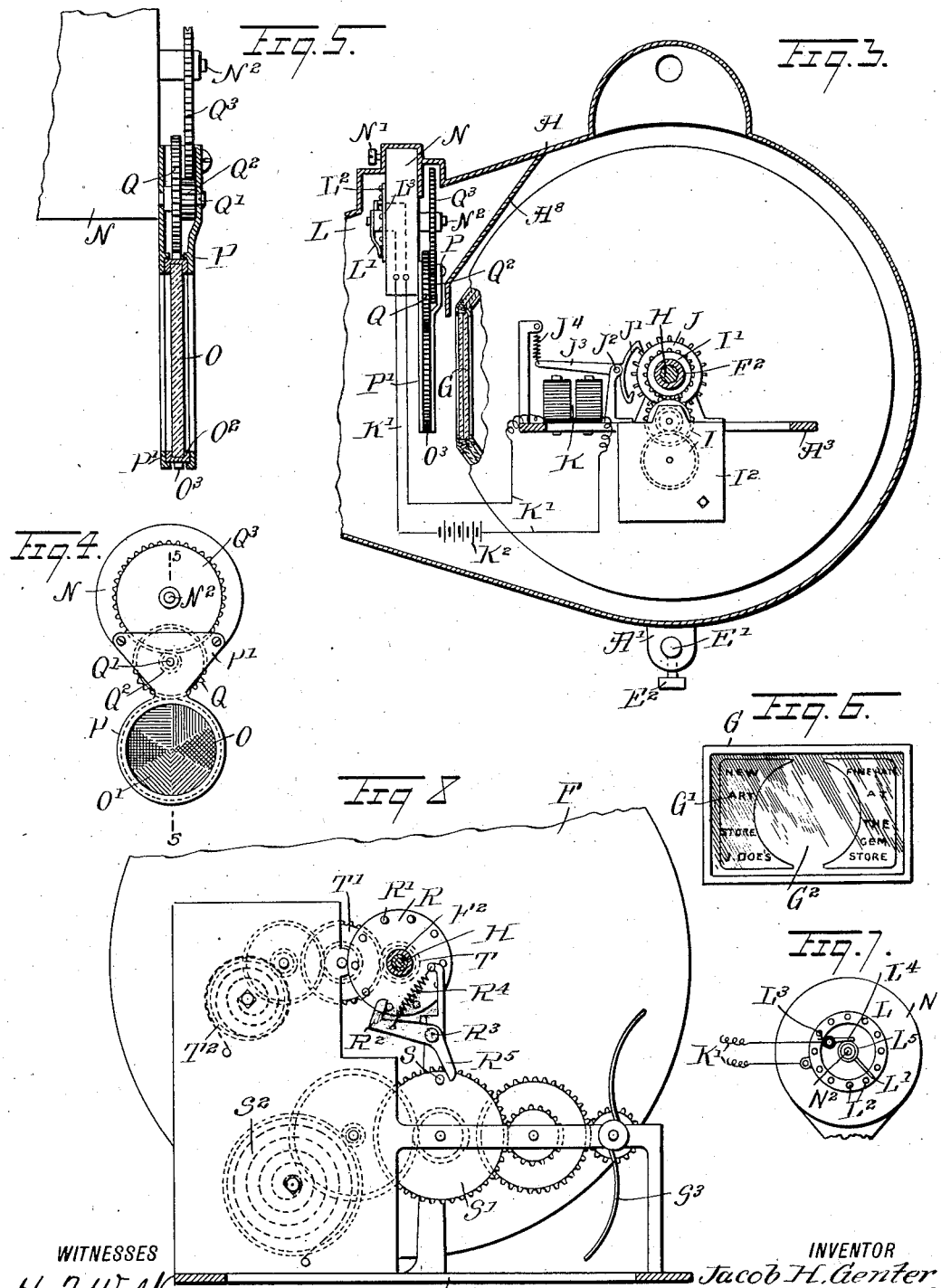

UNITED STATES PATENT OFFICE.

JACOB H. GENTER, OF NEWBURGH, NEW YORK.

PROJECTING APPARATUS.

1,097,013.   Specification of Letters Patent.   Patented May 19, 1914.

Application filed May 14, 1913. Serial No. 767,565.

*To all whom it may concern:*

Be it known that I, JACOB H. GENTER, a citizen of the United States, and a resident of Newburgh, in the county of Orange and State of New York, have invented a new and Improved Projecting Apparatus, of which the following is a full, clear, and exact description.

The object of the invention is to provide a new and improved projecting apparatus more especially designed for use as an advertising medium, and arranged to display the images of desired advertising matter on a screen, wall, sidewalk or other surface together with a revolving image having differently-colored sections to form an attractive feature of the display.

In order to accomplish the desired result, use is made of a periodically-rotated carrier provided with slides adapted to move successively into the field of the projecting apparatus, each slide being provided with advertising matter and with a blank space, and a rotating disk slide also extending in the field of the projecting apparatus and arranged in juxtaposition relative to the said blank space and carrier slide.

A practical embodiment of the invention is represented in the accompanying drawings forming a part of this specification, in which similar characters of reference indicate corresponding parts in all the views.

Figure 1:
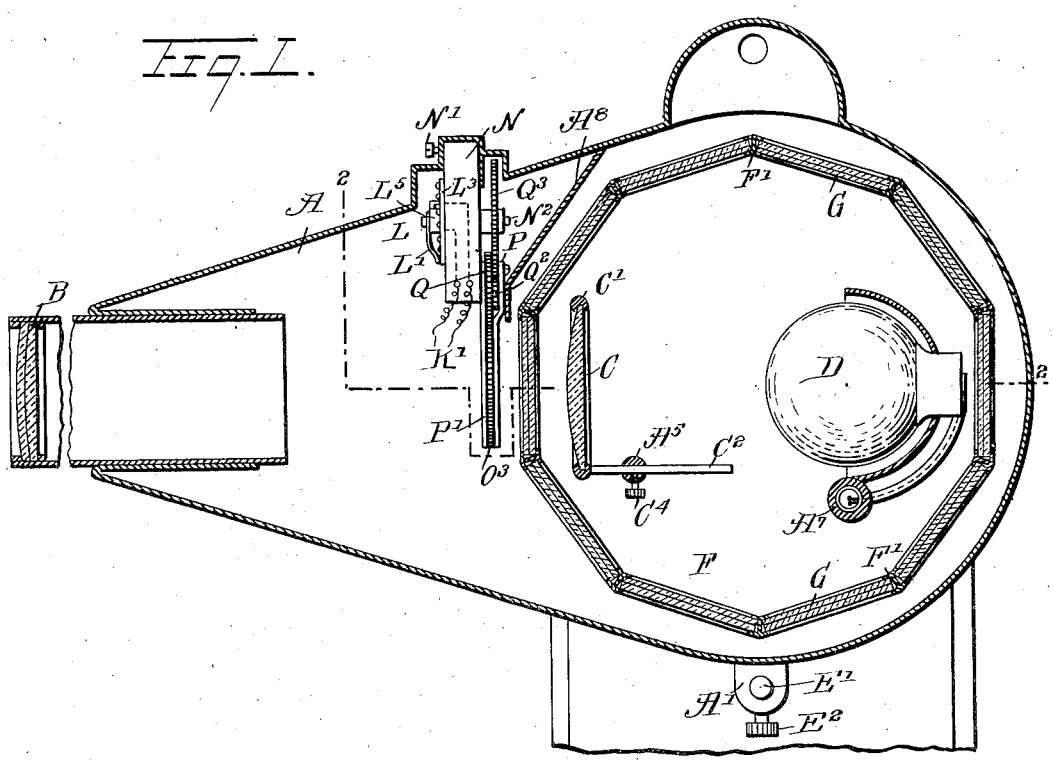
Figure 2:
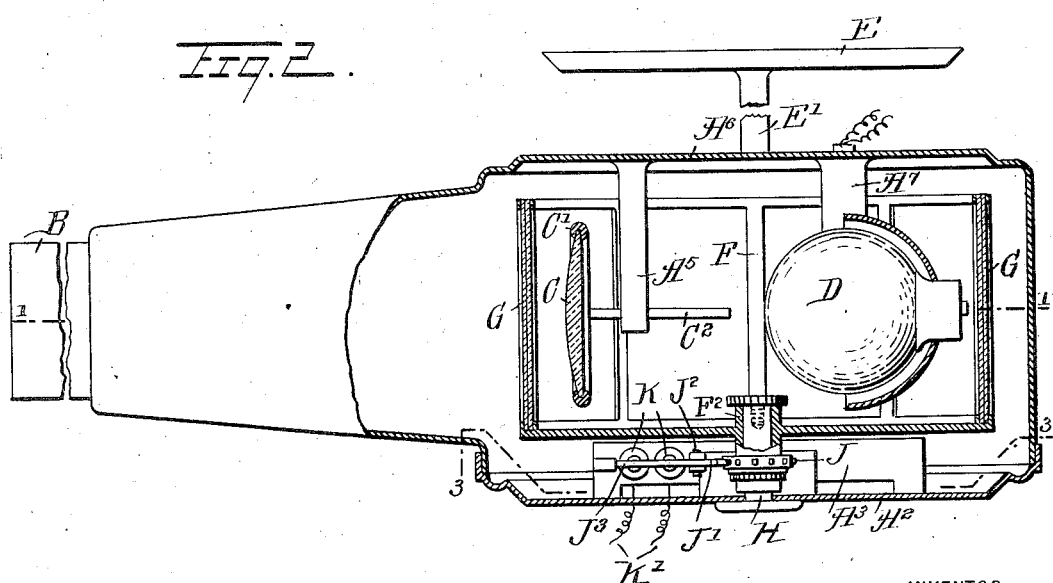

Figure 1 is a sectional side elevation of the projecting apparatus on the line 1—1 of Fig. 2; Fig. 2 is a sectional side elevation of the same on the line 2—2 of Fig. 1; Fig. 3 is a sectional side elevation of the same on the line 3—3 of Fig. 2; Fig. 4 is a face view of the rotating disk slide and the mechanism for rotating the same; Fig. 5 is an enlarged sectional side elevation of the same on the line 5—5 of Fig. 4; Fig. 6 is a face view of one of the carrier slides; Fig. 7 is a face view of the circuit breaker; and Fig. 8 is a side elevation of a modified form of the motor and the mechanism for intermittently rotating the slide carrier, part of which is shown in section.

In the casing A of the projecting apparatus is mounted an objective B, a condenser lens C and a source of light D located in the rear of the condenser lens C, as indicated in Figs. 1 and 2. The casing A is removably held on a bracket E attached to a wall, post or other suitable support, and having a rod E passing through an apertured boss $A'$ held on the bottom of the casing A. The boss $A'$ is provided with a set screw $E^2$ adapted to engage the rod $E'$ so as to securely fasten the casing A on the rod $E'$ of the bracket E.

Within the rear portion of the casing A is mounted to rotate intermittently a slide carrier F, preferably in the form of a skeleton wheel, provided at its peripheral face with guideways $F'$ for the reception of removable slides G containing subject matter $G'$ to be projected and a central blank space $G^2$, as indicated in Fig. 6. By reference to Figs. 1 and 2 it will be noticed that the condenser lens C and the source of light D are arranged within the slide carrier F in such a manner that the slides G move successively into the field of the projecting apparatus, that is, between the condenser lens C and the objective B.

The slide carrier F is rotated intermittently and for this purpose the following arrangement is made: The hub $F^2$ of the slide carrier F is mounted to rotate loosely on a stud H attached to a door or cover $A^2$ on one side of the casing A, and on the said hub $F^2$ is secured a gear wheel $I'$ forming part of a train of gear wheels I driven by a suitable motor $I^2$, such as the usual spring motors used in clocks and the like. The casing of the motor $I^2$ is mounted on a suitable bracket $A^3$ attached to or forming part of the door or cover $A^2$. On the hub $F^2$ is also secured an escapement wheel J engaged by an escapement lever $J'$ fulcrumed at $J^2$ on the bracket $A^3$ and having an arm $J^3$ drawn in an upward direction by a spring $J^4$. The arm $J^3$ forms an armature lever for a pair of electro-magnets K to swing the arm $J^3$ downward at the time the electro-magnets K are energized, and when the electro-magnets K are deënergized the arm $J^3$ swings upward by the action of its spring $J^4$. Normally the escapement lever $J'$ locks the escapement wheel J against movement so that the slide carrier F is at a standstill, but when a swinging motion is given to the escapement lever $J'$ by the action of the electro-magnets K and the spring $K^3$, as above described, then the motor $I^2$ rotates the slide carrier F a distance sufficient to move the next following slide G into the field of the projecting apparatus.

The electro-magnets K are in an electric circuit $K'$ provided with a battery or other source of electrical energy $K^2$, and the electric circuit K' is provided with a circuit breaker L controlled by a motor N similar to the motor I² and removably attached to the casing A by a set screw N' (see Figs. 1 and 3). The driven arbor N² of the motor N is provided with an arm L' adapted to move in contact with spaced contacts L² arranged on a ring L³, to which one terminal of the electric circuit K' is attached, as plainly indicated in Fig. 7. The other terminal of the electric circuit K' is attached to an insulated arm L⁴ in engagement with the hub L⁵ on the arm L'. It will be noticed that when the motor N is running the arm L' moves into and out of engagement with the contacts L² and each time the arm L' moves into engagement with the contact L² the circuit K' is closed so that the electromagnets K are energized to contact with the arm J³ of the escapement lever J'. When the arm L' moves out of engagement with the contact L², the circuit is broken and the arm J³ is returned to uppermost position by the action of its spring J⁴, as previously explained. The number of contacts L² correspond to the number of slides G arranged on the slide carrier F, and the escapement wheel J is provided with double the number of teeth of the number of slides G, so that at each action of the escapement lever J' the slide carrier F is turned to move the next following slide G into the field of the projecting apparatus.

In front of the slide G in active position at the time is arranged a disk slide O, of glass, mica or other suitable transparent material, provided with differently-colored sections O', as plainly indicated in Fig. 4. The disk slide O is at the time in the field of the projecting apparatus and in register with the blank space G² of the slide G, so that when the apparatus is in use the image of the advertising matter G' is projected onto a distant surface together with the colored images of the sections O' of the disk O. Now in order to enhance the appearance of this colored image the disk O is continually rotated, and for this purpose the disk is driven from the motor N. The disk O is mounted in a ring O² mounted to rotate in an annular bearing P' on a frame P attached to the housing of the motor N. The peripheral face of the ring O² is provided with a gear wheel O³ in mesh with a gear wheel Q secured on a shaft Q' journaled in the frame P, and on the shaft Q' is secured a pinion Q² in mesh with a gear wheel Q³ secured on the arbor N² of the motor N. Now when the motor N is running a rotary motion is transmitted by the gearing described to the disk slide O and consequently the colored image of the disk thrown on a distant surface rotates, thus enhancing the appearance of the display. From the foregoing it will be seen that by the arrangement described the motor N is used for rotating the disk slide O and for actuating the circuit breaker L controlling the electro-magnets K and the escapement lever J' to intermittently rotate the slide carrier F.

The condenser lens C is mounted in a frame C' held on a rod C² adjustably secured by a set screw C⁴ on a bracket A⁵ attached to the side A⁶ of the casing A opposite the door A², and the source of light D is mounted on a bracket A⁷ likewise attached to the side A⁶. By mounting the slide carrier F, the motor I² and the escapement mechanism on the door A² the said parts can be readily removed from the casing for change of slides, repairs or other purposes on simply removing the door or cover A². A shield A⁸ is arranged in the casing A intermediate the peripheral face of the slide carrier F and the motor N to protect the latter against the heat emanating from the source of light D.

Instead of using an electro-magnetically controlled escapement as above described, use may be made of a mechanically-controlled escapement, such, for instance, as shown in Fig. 8. In this case an escapement wheel R is secured on the hub F² of the slide carrier F, and the teeth R' of this escapement wheel R are adapted to be successively engaged and released by an escapement lever R² fulcrumed at R³ on the bracket A³ of the casing cover A², and the said escapement lever R² is drawn by a spring R⁴ to normally hold the escapement lever in engagement with one of the teeth R' of the escapement wheel R. The escapement lever R² is provided with an extension arm R⁵ adapted to be engaged by a pin S held on the face of a gear wheel S' forming part of a train of gear wheels driven from a spring motor S², the train of gear wheels also driving a governor wheel S³ to insure uniform rotation of the train of gear wheels.

On the hub F² of the slide carrier F is secured a pinion T in mesh with a gear wheel T' forming part of a train of gear wheels driven by a motor T², preferably of the spring type, the same as the motor S². By the arrangement described the slide carrier F is rotated from the motor T² whenever the pin R' is released by the escapement lever R², so that the next following slide G is moved into the path of the projecting apparatus. The escapement lever R² is periodically actuated by the pin S of the gear wheel S' rotated from the spring motor S².

Having thus described my invention, I claim as new and desire to secure by Letters Patent:

1. A projecting apparatus, a slide carrier provided with slides adapted to move successively into the field of the projecting apparatus, each slide being provided with advertising matter and with a blank space, means for periodically rotating said slide carrier, a rotating disk slide also extending in the field of the projecting apparatus and arranged in juxtaposition relative to the said blank space of the carrier slide, means for rotating said disk slide, and means connecting said last named means with said slide carrier rotating means for controlling the slide carrier rotating means.

2. A projecting apparatus, a slide carrier provided with slides adapted to move successively into the field of the projecting apparatus, each slide being provided with advertising matter and with a blank space, means for periodically rotating said slide carrier, a rotating disk slide also extending in the field of the projecting apparatus and arranged in juxtaposition relative to the said blank space of the carrier slide, the said rotating slide having differently colored sections, means for rotating said disk slide, and means connecting said last named means with said slide carrier rotating means for controlling the slide carrier rotating means.

3. A projecting apparatus provided with a periodically rotated slide carrier provided with slides adapted to move successively into the field of the projecting apparatus, each slide being provided with advertising matter and with a blank space, a rotating disk slide also extending in the field of the projecting apparatus and arranged in juxtaposition relative to the said blank space of the carrier slide, a motor connected with the said disk slide to rotate the latter continually, and a second motor connected with the said slide carrier to rotate the latter intermittently, said second motor being controlled by the movement of the first motor.

4. A projecting apparatus, provided with a periodically rotated slide carrier provided with slides adapted to move successively into the field of the projecting apparatus, each slide being provided with advertising matter and with a blank space, a rotating disk slide also extending in the field of the projecting apparatus and arranged in juxtaposition relative to the said blank space of the carrier slide, a motor connected with the said disk slide to rotate the latter, a second motor, a gearing connecting the said second motor with the said slide carrier, and an escapement for the said gearing to rotate the said slide carrier intermittently to move the slides successively into the field of the projecting apparatus, said second named motor being controlled by said first named motor.

5. A projecting apparatus, provided with a periodically rotated slide carrier provided with slides adapted to move successively into the field of the projecting apparatus, each slide being provided with advertising matter and with a blank space, a rotating disk slide also extending in the field of the projecting apparatus and arranged in juxtaposition relative to the said blank space of the carrier slide, a motor connected with the said disk slide to continually rotate the same, a second motor, a gearing connecting the said second motor with the said slide carrier to rotate the latter, an escapement connected with the said gearing, electro-magnets controlling the said escapement, an electric circuit for the said electro-magnets and a circuit-breaker for the said electric circuit and controlled by the said first-named motor.

In testimony whereof I have signed my name to this specification in the presence of two subscribing witnesses.

JACOB H. GENTER.

Witnesses:
 EDITH I. SMITH,
 FLORENCE S. WALLACE.